Nov. 19, 1940.  C. HAYWOOD  2,221,971

SOLAR-ABSORPTION COOLING SYSTEM FOR BUILDING STRUCTURES

Filed June 23, 1937

INVENTOR.
CARL HAYWOOD,
BY Lockwood, Goldsmith & Hart
ATTORNEYS.

Patented Nov. 19, 1940

2,221,971

UNITED STATES PATENT OFFICE 2,221,971

SOLAR-ABSORPTION COOLING SYSTEM FOR BUILDING STRUCTURES

Carl Haywood, Indianapolis, Ind.

Application June 23, 1937, Serial No. 149,828

4 Claims. (Cl. 62—119)

This invention relates to a solar system operated continuous absorption type air cooling system.

The chief object of this invention is to provide a cooling system for a building structure or compartment which is subject to the rays of the sun for relatively long periods during the day and more especially in localities where the normal daily temperature is relatively high so that the sun's heat responsible for such high temperatures serves as a source of energy for operation of a cooling system to eliminate or reduce the suffering or unpleasantness due to such heat.

The chief feature of the invention consists in the application to a refrigerating system of a solar furnace and associating therewith other apparatus, such as hereinafter described, for accomplishing the foregoing object and other purposes set forth hereinafter.

This invention, as stated, may be applied to a stationary structure such as a building having one or more rooms, or a house type trailer or the like, although not necessarily restricted thereto. It may be utilized where central station electric power is not available, or whenever for reasons of economy, power line connection is not desired.

The full nature of the invention will be understood from the accompanying drawing and the following description and claims:

Figure 1:
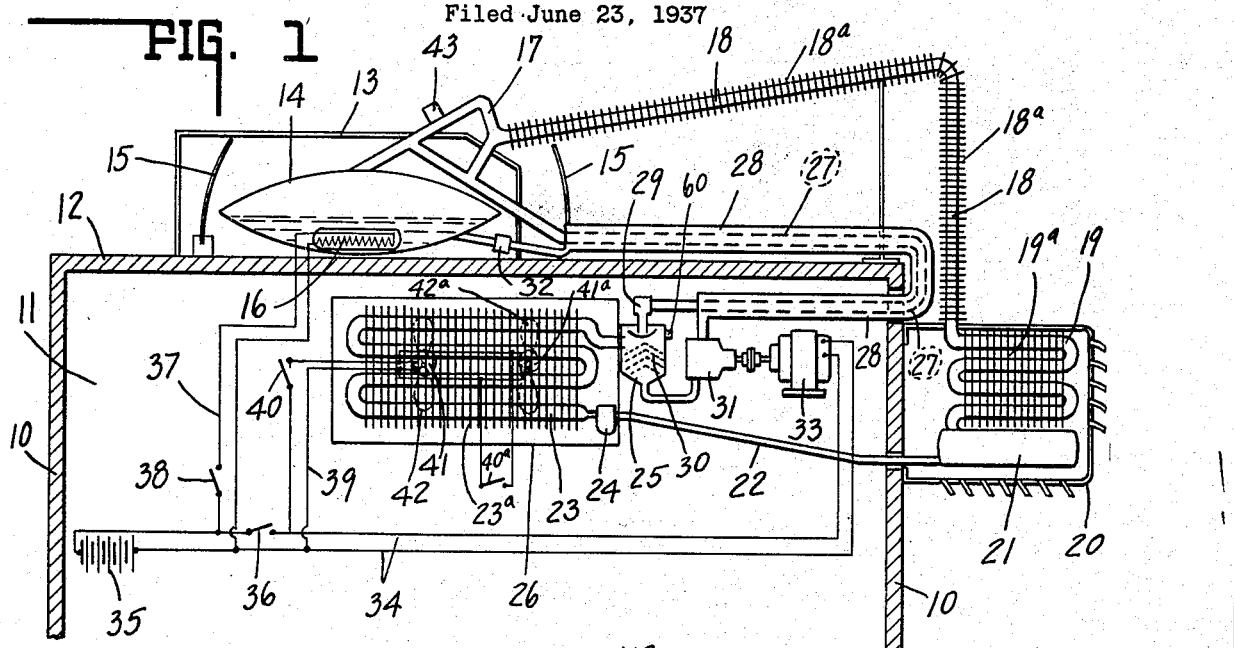
Fig. 1 is a vertical sectional view of a compartment with the invention diagrammatically illustrated as applied thereto.

In Fig. 1 of the drawing, 10 indicates a building structure having at least one room or compartment 11 therein and a relatively flat roof 12. The same supports a glass compartment 13 to eliminate as much as possible the circulation or passage of air should there be a slight breeze.

Mounted within compartment 13 is a generator 14 of an absorption type refrigerating system. If it be assumed the plane of the section is latitudinal, then there may be, if desired, provided mirrors 15 to the east and west of the generator which in the early morning and late evening will reflect the sun rays onto the generator 14.

If desired a source of heat such as an electric heating element or a flue gas heating arrangement, may be provided, but either of these, if employed, is solely utilized as an auxiliary source of heat. Herein such an auxiliary source is indicated by numeral 16.

The numeral 17 indicates an analyzer which automatically separates water vapor from the ammonia vapor liberated by the generator. Element 18, connected at one end to the analyzer, serves as a rectifier and traps out of the gas the remaining moisture. This may be finned as shown at 18a. The other end of the rectifier is connected to the condenser 19 which may be similarly finned as at 19a and enclosed in a louvred compartment 20, preferably mounted in the shade.

Solar heat evaporates ammonia gas and water vapor from the aqua ammonia in the generator. The dry gas following analysis and rectification is liquefied in the condenser located on the shaded side of the building.

The condenser discharges to a receiver 21 in the same compartment 20 which in turn is connected to the expansion line 22 discharging to one end of the evaporator 23 through the automatic expansion valve 24. The evaporator is finned as at 23a. The evaporator is illustrated as a sinuous conduit and its other end is connected to the absorber 25.

The condenser changes the vapor ammonia to liquid ammonia, and the evaporator reverses this change of state thereby abstracting heat from chamber 26 which includes the evaporator. The receiver serves as a storage receptacle for liquid ammonia and its capacity may be so arranged relative to the evaporator capacity that an appreciable "carry-over" is possible, in some instances, the device storing sufficient liquid ammonia for use during the entire night when solar heat is not available for vaporization.

In the absorber 25 the heated ammonia vapor is absorbed by the weak aqua ammonia which is supplied thereto by the weak liquor line 27 enveloped by the heat exchanger 28. Such supply is controlled by the automatic throttling valve 29 and is diverted by baffles 30 in the absorber 25.

The weak liquor upon absorbing the ammonia gas in the absorber becomes strong liquor and is drawn from the bottom of the absorber by the pump 31 and supplied by line 28 (previously designated as heat exchange) to the generator through the check valve 32. The pump 31 may be driven by an electric motor 33 supplied by lines 34 from a conventionally illustrated source of electrical energy 35 and controlled by switch 36. The auxiliary heating unit 16 may also be connected to the source of energy 35 by lines 37 and controlled by switch 38.

Lines 39 connected to said source of energy and controlled by switch 40 are connected to an auxiliary or a circulating fan operating motor 41 operating fan 42. This fan circulates the air through the finned sinuosities of the evaporator which is protected by a suitable grill arrangement 26. An additional motor 41a and 42a controlled by switch 40a may be provided if desired.

Plug 43 is provided for filling the system. Switches 36, 38 and 40 are of conventional type that is, may be thermostatically controlled or manually controlled, as described.

Whenever desired, there may be provided in each room of the building and which is to be cooled an evaporator with its expansion valve and a circulating fan. All evaporators would be supplied by line 22 and all evaporators would discharge to a common absorber 25.

As herein illustrated, the pump motor 33 is usually less than 1/16 horsepower and the fan motor 41 may be as small as desired or as large as required. An automobile type storage battery, therefore, normally provides sufficient energy for motor operation for a reasonable period of time. Whenever central station power is available, the auxiliary heat source 16 may be utilized as often as required or desired, and in such event the system receiver 21 need not be of such large capacity since the element 16 could be automatically cut in, whenever the room temperature exceeded the predetermined maximum desired, irrespective of whether the solar heating portion of the system was operative or not.

Many individuals are not much affected by heat during their waking hours but experience difficulty in getting to sleep during hot nights. Where this is the case and where central station power is not available for auxiliary heating, the receiver should be constructed of large size to enable sufficient liquor to accumulate therein during the day to permit of operation of the system during the night. While continuous operation of all parts of the system is possible, and in fact is the usual method of operation, it is apparent that continuous day and night operation is not possible. It is to be noted, however, that day and night cooling may be had with two separate systems.

Where only night operation is required, the switch 36 is open during the day preventing operation of the pump and evaporator. This permits the accumulation of strong liquor in the receiver. Also, during the day automatic throttling valve 29 is kept closed and weak liquor from the generator is stored in the tube 27. In the evening switches 36 and 40 are closed and valve 29 opened whereby the system functions as in continuous daytime operation, the pump returning the fortified liquor from the absorber 25 to the generator where it awaits the action of the sun the following morning. The generator, in other words, acts as a storage tank during night operation.

Figure 2:
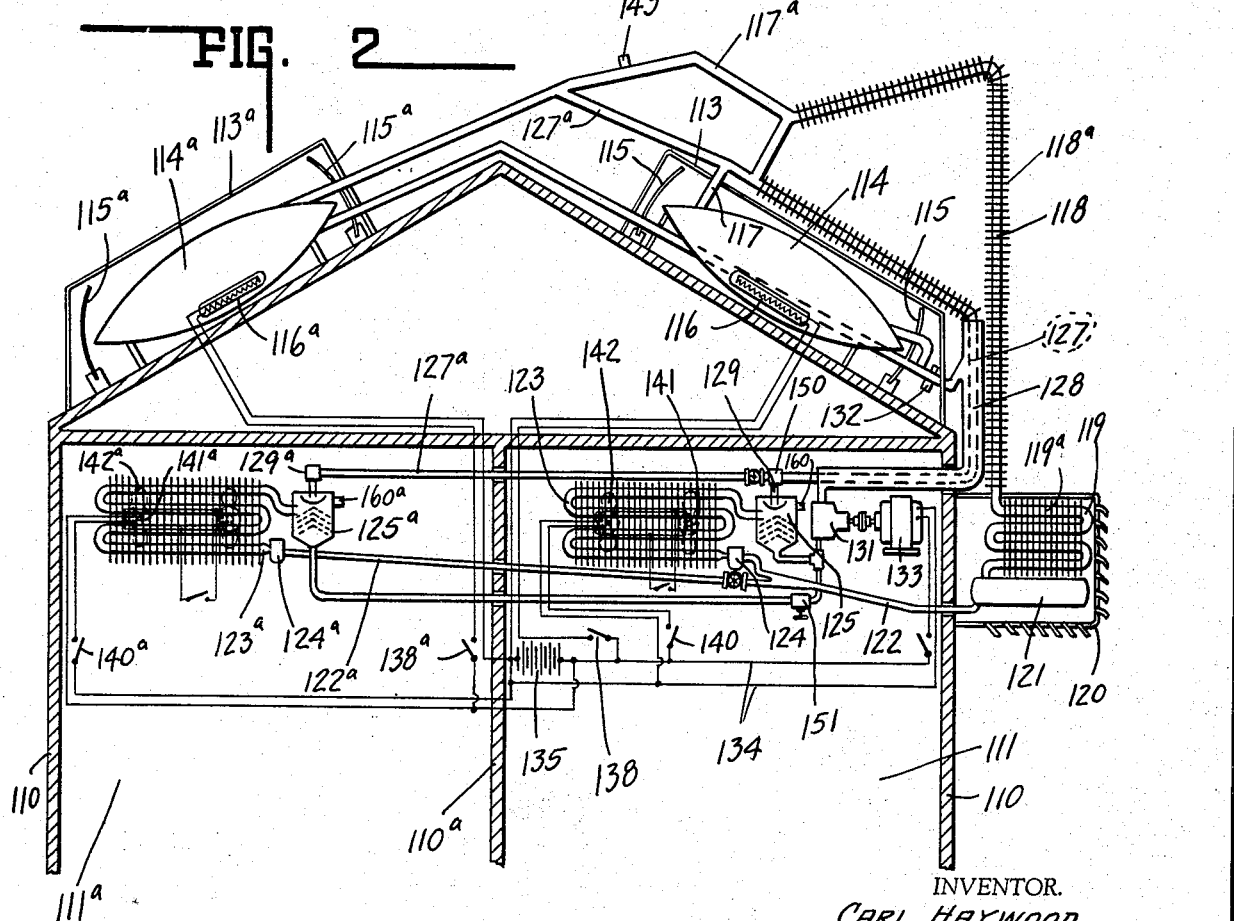
Fig. 2 is a similar view of a modified form thereof.

In Fig. 2 of the drawing, there is illustrated a modification of the form of the invention shown in Fig. 1. This modification only differs therefrom by providing two generators connected in parallel into the system in place of a single generator, said dual generators being positioned on both sides of a hip roof instead of flat roof. Parts in Fig. 2 like or corresponding to parts in Fig. 1, bear similar numerals of the one hundred series and the subscript a.

In this modification the two evaporators while connected in multiple, are each provided with an absorber. Valve 150 between line 127 and 127a and valve 151 in the connection between absorber 125a and pump 131 provide a control for isolating the portion of the system in room 111a from the remainder of the system. Similar valves may be provided ahead and behind absorber 125, if desired.

To facilitate filling of the system, the absorber may be provided with a filling plug. Thus, in Fig. 1 absorber 25 is shown provided with plug 60 while in Fig. 2 absorber 125 is shown provided with filling plug 160 and absorber 125a is shown provided with filling plug 160a.

While the invention has been described and illustrated in great detail in the foregoing description and accompanying drawing, the same is to be considered as illustrative and not restrictive in character, and the several modifications herein disclosed by way of illustration and/or description as well as others which will readily suggest themselves to persons skilled in this art, are all considered to be within the broad scope of this invention, reference being had to the appended claims.

The invention claimed is:

1. An absorption cooling system for a compartment or the like having a roof with at least two portions in angular relation, including in combination a generator exposedly positioned on each of at least two of such roof portions and subject to solar heat, a single condenser positioned exteriorly of the compartment and operatively associated with all generators, and an evaporator within the compartment for cooling the air therein.

2. An absorption cooling system for a structure having a plurality of chambers therein and a roof with at least two portions in angular relation, including in combination a generator on each of at least two of such roof portions and exposed to solar heat, an evaporator in each of at least two chambers for cooling the air therein, a single condenser positioned exteriorly of the compartment and operatively associated with all generators and all evaporators, and absorber means connected to all generators and evaporators.

3. A system as defined by claim 1, including a receiver associated with said condenser and having communication with said evaporator, said receiver being of sufficient capacity to store all refrigerant condensed by said condenser during the day thereby permitting night operation of the system.

4. A system as defined by claim 2, including a receiver associated with said condenser and having communication with said evaporators, said receiver being of sufficient capacity to store all refrigerant condensed by said condenser during the day thereby permitting night operation of the system.

CARL HAYWOOD.